(12) United States Patent
Yue et al.

(10) Patent No.: US 11,578,808 B2
(45) Date of Patent: Feb. 14, 2023

(54) PRESSURE RELIEF DEVICE

(71) Applicant: ILLINOIS TOOL WORKS INC., Glenview, IL (US)

(72) Inventors: Guofeng Yue, Ningbo (CN); Qihong Teng, Ningbo (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/951,148

(22) Filed: Nov. 18, 2020

(65) Prior Publication Data

US 2021/0148478 A1 May 20, 2021

(30) Foreign Application Priority Data

Nov. 18, 2019 (CN) .......................... 201911128066.8
Nov. 3, 2020 (CN) .......................... 202011209699.4

(51) Int. Cl.
*F16K 17/16* (2006.01)
*F16K 17/164* (2006.01)

(52) U.S. Cl.
CPC ................................. *F16K 17/164* (2013.01)

(58) Field of Classification Search
CPC .. F16K 17/164; H01M 50/324; H01M 50/394
USPC ................................................. 137/197–199
See application file for complete search history.

(56) References Cited

U.S. PATENT DOCUMENTS

| 10,557,561 | B2* | 2/2020 | Kleinke | F16K 31/126 |
| 2015/0340673 | A1* | 11/2015 | Joswig | H01M 50/308 |
| | | | | 429/56 |
| 2018/0097214 | A1* | 4/2018 | Ogawa | H05K 5/0221 |
| 2020/0340592 | A1* | 10/2020 | Nakayama | F16K 15/148 |
| 2021/0320376 | A1* | 10/2021 | Zbiral | H01M 50/333 |

OTHER PUBLICATIONS

Original and Translation of DE 102017214754 A1; Kochanski André; Feb. 28, 2019.*

* cited by examiner

*Primary Examiner* — Paul J Gray
(74) *Attorney, Agent, or Firm* — Quarles & Brady LLP

(57) ABSTRACT

A pressure relief device includes a mounting seat, a valve core, and a pressure relief member. The mounting seat is internally provided with a fluid channel, and the fluid channel is capable of communicating with an internal space of a component to be subject to pressure relief. The valve core is arranged to be aligned with the fluid channel in the mounting seat, and a pressure relief channel is formed between an outer edge of the valve core and an inner wall of the fluid channel of the mounting seat. The pressure relief member is sleeved on the outer edge of the valve core and is deformable and configured to open and close the pressure relief channel by means of its deformation. The pressure relief device of the present application utilizes the deformable property of the pressure relief member to achieve the effect of repeated use and multiple pressure reliefs of the pressure relief device.

10 Claims, 8 Drawing Sheets

PRESSURE RELIEF DEVICE

CROSS REFERENCES TO RELATED APPLICATIONS

This application claims priority to Chinese Application Serial Nos. 201911128066.8 and 202011209699.4, respectively filed Nov. 18, 2019, and Nov. 3, 2020, the contents of which are incorporated herein by reference in their entirety.

TECHNICAL FIELD

The present application relates to a pressure relief device, and in particular to a pressure relief device for a battery pack.

BACKGROUND ART

A battery will generate gas during use. If the gas is not discharged in time and accumulates in a battery pack, the pressure inside the battery pack will increase, which will affect the use of the battery pack. Therefore, during manufacturing a battery, it is often necessary to mount a pressure relief device on the battery pack. If the pressure in the battery pack is higher than a predetermined value, the pressure relief device can be automatically opened to discharge the gas accumulated in the battery pack to relieve the excessive pressure therein.

SUMMARY OF THE INVENTION

The present application provides a pressure relief device, comprising a mounting seat, a valve core, and a pressure relief member, wherein the mounting seat is internally provided with a fluid channel, and the fluid channel is capable of communicating with an internal space of a component to be subject to pressure relief; the valve core is arranged to be aligned with the fluid channel in the mounting seat, and a pressure relief channel is formed between an outer edge of the valve core and an inner wall of the fluid channel of the mounting seat; and the pressure relief member is sleeved on the outer edge of the valve core, wherein the pressure relief member is deformable and is configured to open and close the pressure relief channel by means of its deformation. In the present application, by providing the pressure relief member on the outside of the valve core of the pressure relief device and using the deformable performance of the pressure relief member itself, the pressure relief device can achieve the effect of repeated use and multiple pressure reliefs.

In the pressure relief device as described above, the pressure relief member has a pressure bearing side, and the pressure relief member can be configured to be in a blocked operating state in which the pressure relief channel is closed and an open operating state; wherein if a pressure on the pressure bearing side of the pressure relief member exceeds a predetermined value, the pressure relief member is deformed, such that the pressure relief member changes from the blocked operating state to the open operating state in which the pressure relief channel is opened; and wherein if the pressure on the pressure bearing side of the pressure relief member is less than the predetermined value, the pressure relief member returns to the blocked operating state.

In the pressure relief device as described above, the pressure relief member is made of a material having a deformation property.

In the pressure relief device as described above, the valve core has a circular cross section; and the pressure relief member is in the form of a ring, the pressure relief member comprises an inner edge and an outer edge, the inner edge is connected to the valve core, and the outer edge abuts against the mounting seat in a free state to close the pressure relief channel.

In the pressure relief device as described above, the pressure relief member extends outward and downward from the inner edge to the outer edge.

In the pressure relief device as described above, the valve core is made of plastic, and the pressure relief member is fixed to an outer surface of the valve core by a secondary molding process.

In the pressure relief device as described above, the valve core is provided with a valve core through hole; and the pressure relief device further comprises a waterproof and gas-permeable membrane, and the waterproof and gas-permeable membrane covers the valve core through hole of the valve core, such that gas from the pressure relief channel is capable of being discharged to external environment through the waterproof and gas-permeable membrane. In the pressure relief device as described above, the pressure relief device further comprises a protective cover, the protective cover is provided with a protective cover through hole, and the protective cover is snapped on the mounting seat, such that the valve core and the pressure relief member are accommodated in a space formed by the mounting seat and the protective cover.

The pressure relief device as described above further comprises a seal ring. The mounting seat is provided with at least one opening at a position close to the pressure relief member, and when the outer edge of the pressure relief member flexes up, gas flowing out between the outer edge of the pressure relief member and the inner wall of the fluid channel is capable of being released to external environment through the at least one opening.

In the pressure relief device as described above, the pressure relief device is applied in a battery pack, the battery pack comprises a battery pack housing, the battery pack housing is provided with a mounting hole, and the pressure relief device is mounted to the battery pack housing through the mounting hole.

In the present application, the pressure relief member is arranged inside the pressure relief device, and the elastic property of the pressure relief member itself is used to open and close the pressure relief channel in the pressure relief device, thereby achieving the effect of the intensive pressure relief of the pressure relief device. Since the elasticity of the pressure relief member enables it to return to an initial state in time and pressure relief each time does not destroy the existing structure of the pressure relief device, the pressure relief device of the present application can achieve the effect of the intensive pressure relief multiple times and can be repeatedly used in the battery pack, thereby greatly reducing the use cost of the pressure relief device.

DETAILED DESCRIPTION OF EMBODIMENTS

Figure 1:
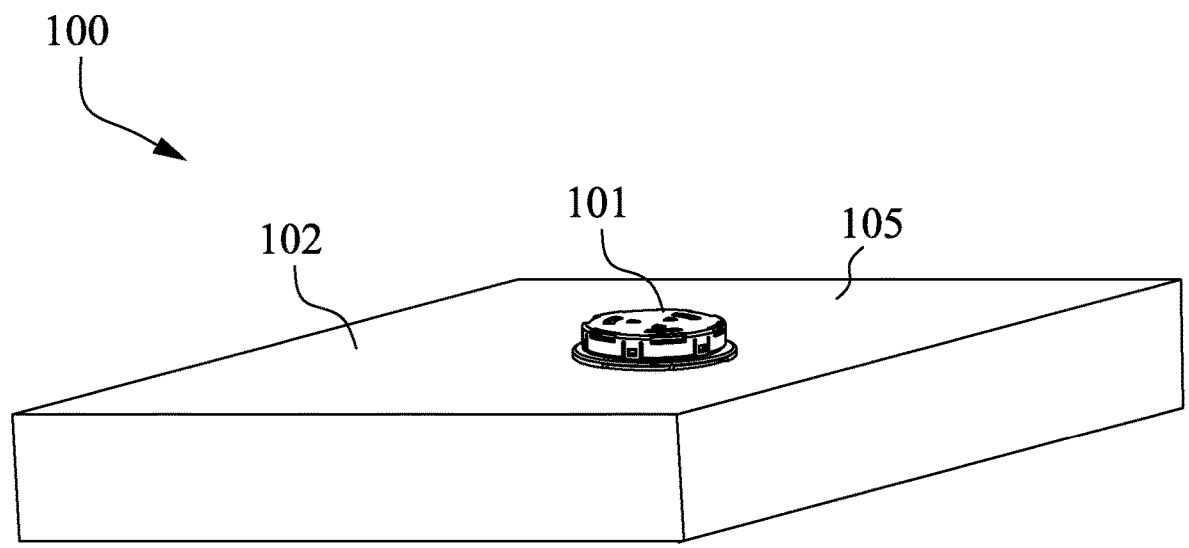
FIG. 1 is a schematic diagram of a battery pack using a pressure relief device according to an embodiment of the present application.

Specific embodiments of the present disclosure are described below with reference to the accompanying drawings which constitute part of this description. It should be understood that although the terms such as "front", "rear", "upper", "lower", "left", and "right" indicating directions in the present disclosure are used to describe various exemplary structural parts and elements in the present disclosure, these terms used herein are merely used for ease of description and are determined based on the exemplary orientation shown in the accompanying drawings. Since the embodiments disclosed in the present disclosure can be arranged in different directions, these terms indicating directions are only illustrative and should not be considered as limitations. If possible, the same or similar reference numerals used in the present disclosure refer to the same components.

FIG. 1 shows a schematic diagram of a battery pack 100 using a pressure relief device 101 according to an embodiment of the present application. As shown in FIG. 1, the battery pack 100 is generally rectangular. In other embodiments, the battery pack 100 may also have other shapes. The battery pack 100 comprises a battery pack housing 102 and the pressure relief device 101. The battery pack housing 102 has an accommodating space formed therein for accommodating battery cells (not shown). The pressure relief device 101 is mounted on a top plate 105 of the battery pack housing 102 and communicates with the accommodating space inside the battery pack housing 102, and can relieve the pressure of the accommodating space inside the battery pack housing 102.

Figure 2A:
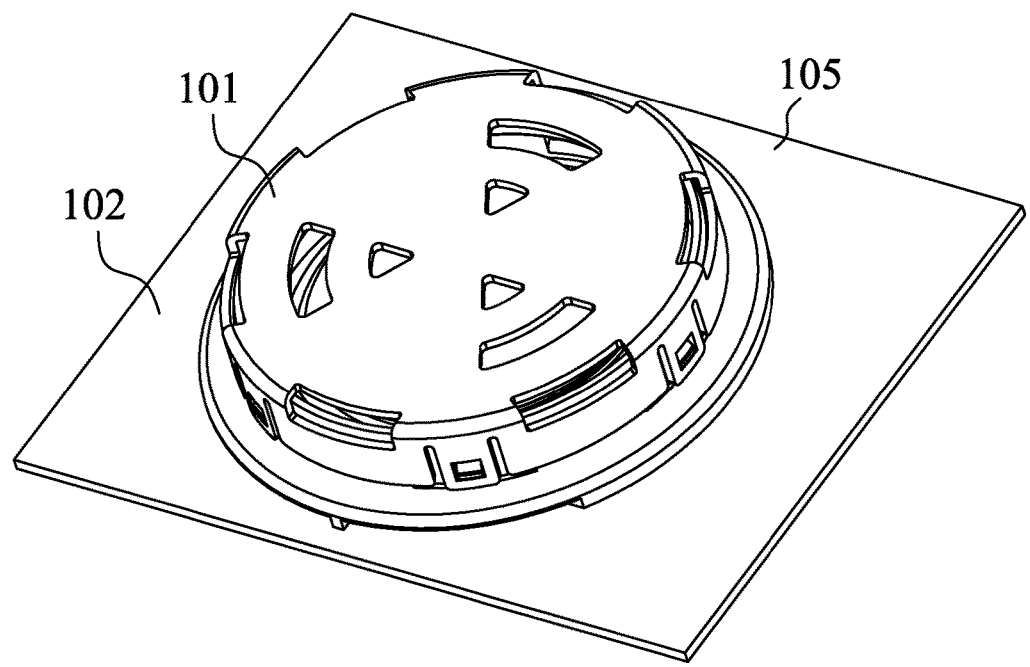
FIG. 2A is a partial perspective view of the pressure relief device and a top plate of the battery pack viewed from the outside of the battery pack in FIG. 1.
Figure 2B:
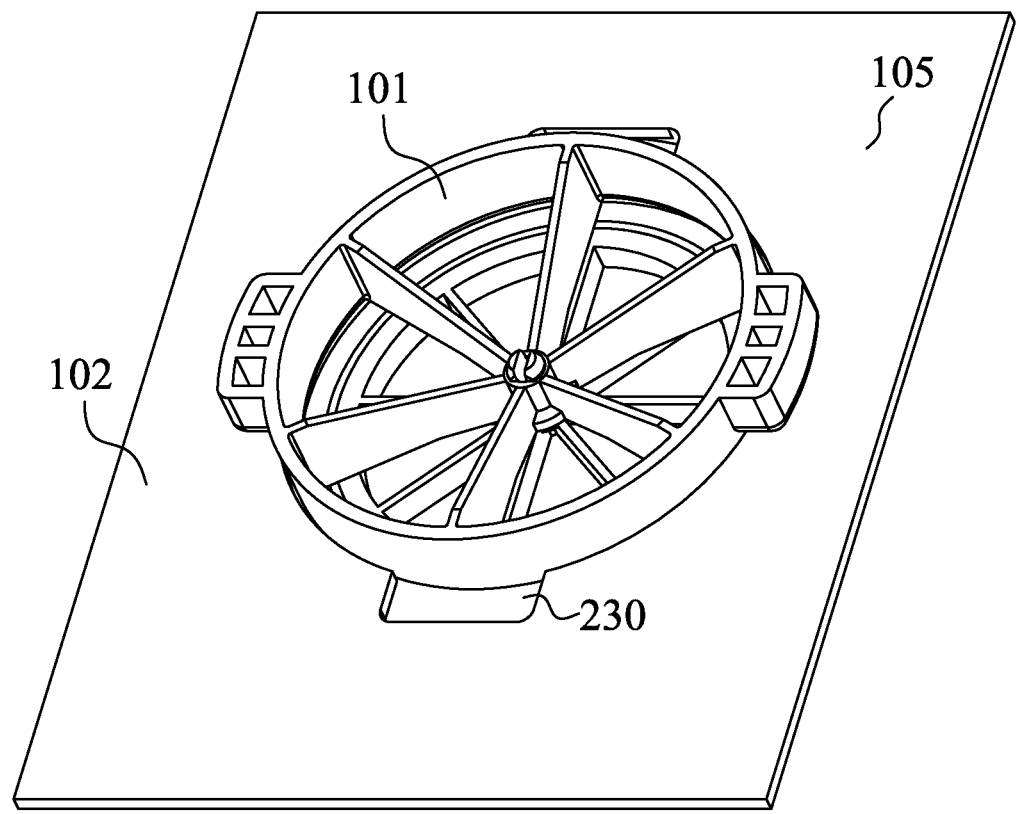
FIG. 2B is a partial perspective view of the pressure relief device and the top plate of the battery pack viewed from the inside of the battery pack in FIG. 1.

FIG. 2A is a partial perspective view of the pressure relief device 101 and the top plate 105 of the battery pack 100 viewed from the outside of the battery pack 100 in FIG. 1, showing the structure of the pressure relief device 101 outside the battery pack housing 102; FIG. 2B is a partial perspective view of the pressure relief device 101 and the top plate of the battery pack 100 viewed from the inside of the battery pack 100 in FIG. 1, showing the structure of the pressure relief device 101 inside the battery pack housing 102. As shown in FIGS. 2A and 2B, the battery pack housing 102 is provided with a mounting hole 230, and the pressure relief device 101 is mounted to the battery pack housing 102 through the mounting hole 230. The lower part of the pressure relief device 101 passes through the mounting hole 230 and extends into the battery pack 100, and the upper part of the pressure relief device 101 is exposed to the external environment. If the gas pressure inside the battery pack 100 is greater than or equal to a predetermined value, the pressure relief device 101 can release the gas inside the battery pack 100 to the external environment in an intensive manner, so as to release the pressure of the battery pack 100.

Figure 3A:
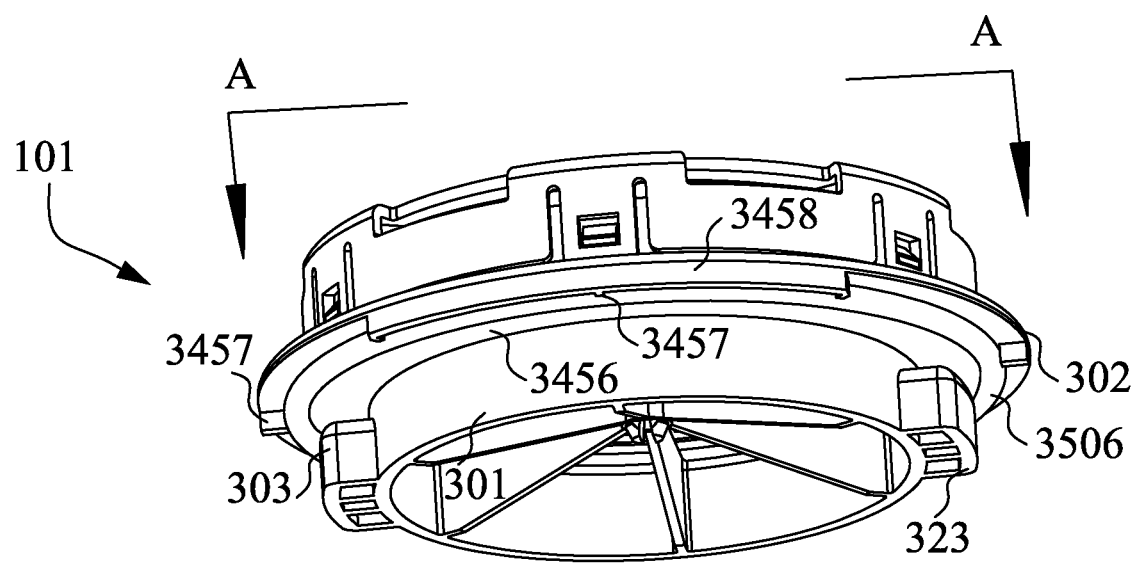
FIG. 3A is a perspective view of the pressure relief device in FIG. 1.
Figure 3B:
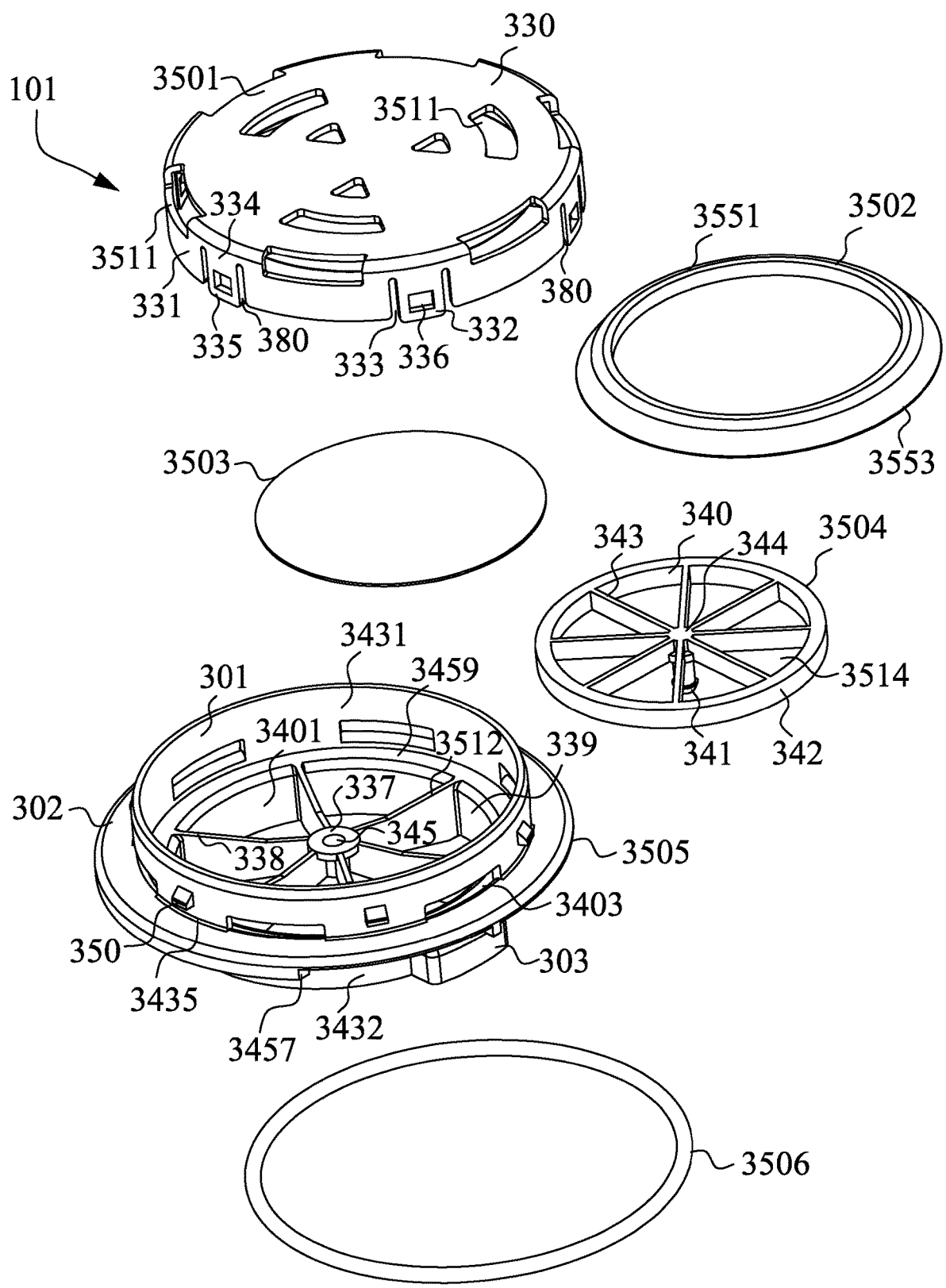
FIG. 3B is an exploded view of the pressure relief device in FIG. 3A.
Figure 3C:
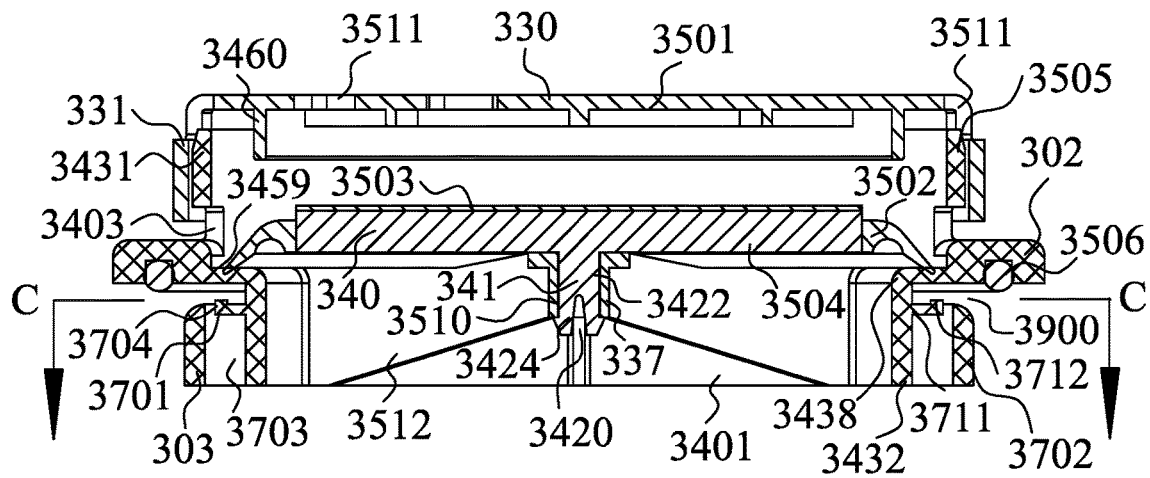
FIG. 3C is an axial section view of the pressure relief device in FIG. 3A taken along the direction of an arrow according to the line A-A in FIG. 3A.
Figure 3D:
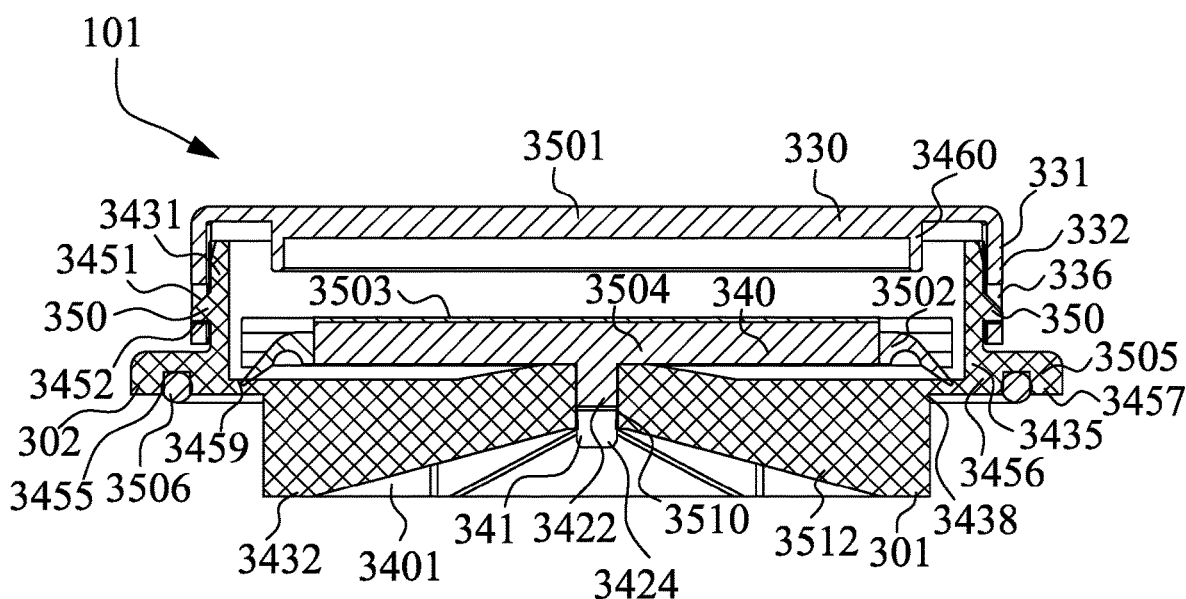
FIG. 3D is an axial section view of the pressure relief device in FIG. 3A taken along a line that is at a 90-degree angle with respect to the line A-A in FIG. 3A.
Figure 3E:
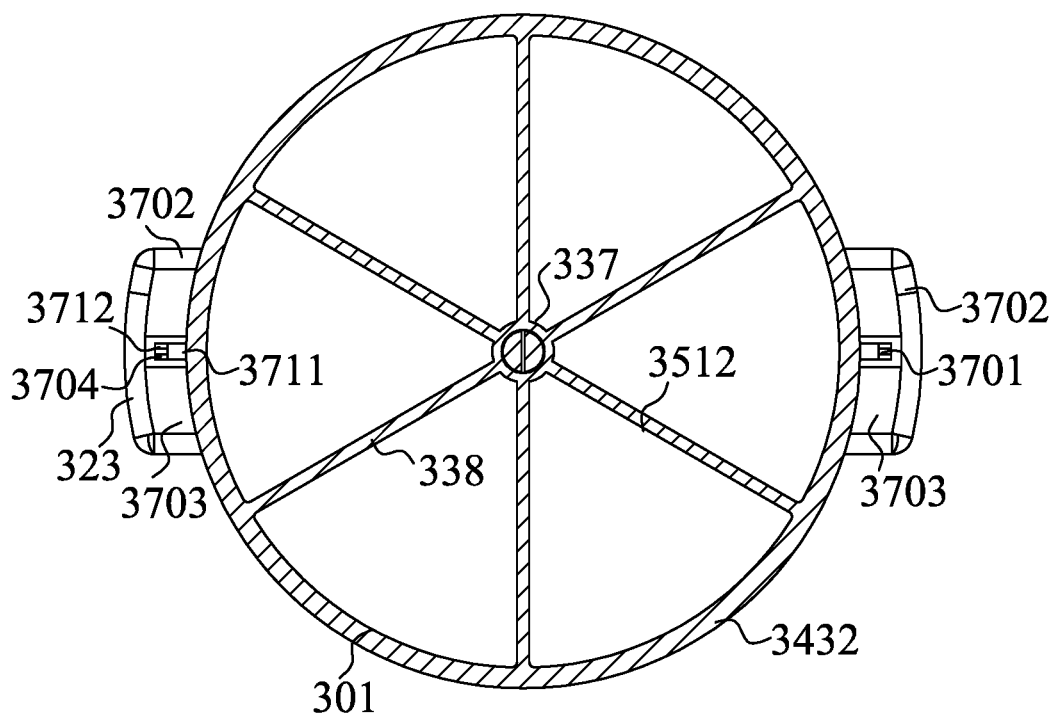
FIG. 3E is a section view along the line C-C in FIG. 3C.

FIG. 3A is a perspective view of the pressure relief device 101 in FIG. 1, and FIG. 3B shows an exploded view of the pressure relief device 101 in FIG. 3A. FIG. 3C is an axial section view of the pressure relief device 101 in FIG. 3A taken along the direction of an arrow according to the line A-A in FIG. 3A, FIG. 3D is an axial section view of the pressure relief device 101 in FIG. 3A taken along a line that is at a 90-degree angle with respect to the line A-A in FIG. 3A, and FIG. 3E is a section view along line C-C in FIG. 3C. These figures collectively show the specific structure of the pressure relief device 101.

As shown in FIG. 3B, the pressure relief device 101 comprises a protective cover 3501, a pressure relief member 3502, a waterproof and gas-permeable membrane 3503, a valve core 3504, a mounting seat 3505 and a seal ring 3506. Both the pressure relief member 3502 and the seal ring 3506 are in the form of a circular ring and are made of elastic materials. In this embodiment, the pressure relief member 3502 and the seal ring 3506 are made of silica gel or rubber. For example, the pressure relief member 3502 is made of LR or HNBR material, and the seal ring 3506 is made of VMQ or EPDM material. The cross sections of the protective cover 3501, the waterproof and gas-permeable membrane 3503, the valve core 3504, and the mounting seat 3505 are generally circular. The waterproof and gas-permeable membrane 3503 is made of a waterproof and gas-permeable material, and the protective cover 3501, the valve core 3504 and the mounting seat 3505 are made of materials which is heat-resistant and has some rigidity. In this embodiment, the waterproof and gas-permeable membrane 3503 is made of ePTFE material. The protective cover 3501, the valve core 3504 and the mounting seat 3505 are made of PA66 material.

As shown in FIGS. 3C and 3D, the protective cover 3501 is snapped on the mounting seat 3505, such that the waterproof and gas-permeable membrane 3503, the valve core 3504 and the pressure relief member 3502 can be accommodated in the space formed by the mounting seat 3505 and the protective cover 3501.

As can be seen from FIGS. 3C and 3D in combination with FIG. 3B, the protective cover 3501 comprises a top cover 330 and a cover wall 331, the top cover 330 is in the form of a circular flat plate, and the cover wall 331 extends vertically downward from an outer edge of the top cover 330. The protective cover 3501 is provided with a plurality of protective cover through holes 3511 for assisting in discharging the gas inside the pressure relief device 101 to the external environment. A plurality of ribs 3460 are provided on an inner surface of the top cover 330 for abutting against the top end of the mounting seat 3505. The cover wall 331 is provided with a plurality of notches 380 and a plurality of snapping receivers 332 arranged at the notches 380. The inner and outer surfaces of the snapping receivers 332 are flush with the inner and outer surfaces of the cover wall 331 respectively. The snapping receiver 332 and the side wall of a corresponding notch 380 of the cover wall 331 are separated by a partition slot 333, and the partition slot 333 extends from the outer edge of the cover wall 331 toward the top cover 330. The partition slot 333 is arranged such that the upper end 334 of the snapping receiver 332 is connected to the cover wall 331, and there is a gap between the lower end 335 of the snapping receiver 332 and the cover wall 331, so when an external force is applied to the lower end 335 of the snapping receiver 332, the lower end 335 of the snapping receiver 332 can expand and contract with respect to the cover wall 331. In other words, when an inward force is applied to the lower end 335 of the snapping receiver 332, the lower end 335 of the snapping receiver 332 will be deflected toward the space enclosed by the cover wall 331; and when an outward force is applied to the lower end 335 of the snapping receiver 332, the lower end 335 of the snapping receiver 332 will be deflected away from the space enclosed by the cover wall 331. The snapping receiver 332 is provided with a snapping hole 336 at a position close to the lower end 335, and the snapping hole 336 runs through the inner and outer surfaces of the snapping receiver 332 and is used for fitting and receiving a snapping member 350 on the mounting seat 3505. In this embodiment, the cover wall 331 of the protective cover 3501 is provided with six snapping receivers 332. In other embodiments, the number of the snapping receivers 332 may be different.

As shown in FIGS. 3B-3D, the valve core 3504 comprises a valve core body 340 and a valve core mounting member 341. The valve core body 340 has a circular cross section, and comprises a valve core outer rim 342, a valve core central post 344 and a plurality of valve core spokes 343. The valve core outer rim 342 is in the form of a ring, and the valve core central post 344 is located at a center position of the valve core outer rim 342 and extends along an axis of the valve core 504. The valve core spoke 343 is connected to the valve core central post 344 at one end, and is connected to the valve core outer rim 342 at the other end. The valve core spokes 343 can be used to support the waterproof and gas-permeable membrane 3503. There are eight valve core spokes 343 in the valve core 3504 in this embodiment, and the eight valve core spokes 343 are evenly arranged around the valve core central post 344, such that eight valve core through holes 3514 are formed inside the valve core outer rim 342. The valve core mounting member 341 is formed to extend downward from the valve core central post 344 and is substantially perpendicular to the valve core body 340.

As shown in FIGS. 3C and 3D, the valve core mounting member 341 comprises an extension part 3422 and a pair of arms 3424. The extension part 3422 is generally cylindrical, and the proximal end of the extension part 3422 is connected to the valve core body 340. The pair of arms 3424 are connected to a distal end of the extension part 3422, and the pair of arms 3424 are spaced apart by a recess 3420. The outer surfaces of the pair of arms 3424 facing away from each other are provided with ramp-shaped flanges, and the flanges extend obliquely outward from ends of the pair of arms 3424 toward the distal end of the extension part 3422. Therefore, a stepped snapping portion is formed between the outer surfaces of the pair of arms 3424 and the extension part 3422. When the pair of arms 3424 are pressed by an external force, the pair of arms 3424 can be biased to approach each other towards the recess 3420 until the inner sides of the pair of arms 3424 abut against each other; When the external force is removed, the pair of arms 3424 move away from each other and return to an expand position relative to each other. The above arrangement of the valve core mounting member 341 allows the valve core mounting member 341 to be expandable and contractible, such that the valve core 3504 can be removably mounted on the mounting seat 3505.

As shown in FIGS. 3B-3D, the waterproof and gas-permeable membrane 3503 is a circular thin sheet, the size of which is approximately the same as the cross section of the valve core body 340, such that the waterproof and gas-permeable membrane 3503 can fitly cover the upper surface of the valve core body 340. The waterproof and gas-permeable membrane 3503 can prevent liquid from permeating and allow gas to permeate, thereby realizing the effects of being dust-proof, waterproof and gas-permeable. In this embodiment, the waterproof and gas-permeable membrane 3503 meets the requirements of IP67. In addition, in this embodiment, the waterproof and gas-permeable membrane 3503 is secured to the upper surface of the valve core 3504 by ultrasonic welding, and in this case the valve core spoke 343 is also welded. In other embodiments, the waterproof and gas-permeable membrane 3503 may also be connected to the valve core 3504 by other connection means, such as by bonding with adhesive or fixing by a secondary molding process.

The pressure relief member 3502 is in the form of a ring. The pressure relief member 3502 has a splay axial section, which comprises an inner edge 3551 forming an inner peripheral surface of the pressure relief member 3502, and an outer edge 3553 extending downward and outward from the inner edge 3551. In a free state, that is, no interference from an external force, the outer edge 3553 of the pressure relief member 3502 is extended outwardly from the inner edge 3551 and located below the inner edge 3551. In this embodiment, the pressure relief member 3502 has an inner diameter approximately equal to the outer diameter of the valve core body 340, and is securely connected to the valve core 3504 by means of secondary molding, such that the inner peripheral surface of the pressure relief member 3502 and the outer peripheral surface of the valve core 3504 are snugly attached to each other. In other embodiments, other securing means may also be used. For example, the inner diameter of the pressure relief member 3502 is configured to be slightly less than the outer diameter of the valve core body 340, such that the pressure relief member 3502 can be securely sleeved on the outer edge of the valve core 3504 by means of its expansion and contraction property. As shown in FIGS. 3C and 3D, when the pressure relief member 3502 is sleeved on the valve core 3504, the pressure relief member 3502 and the valve core 3504 are generally formed into an umbrella shape as a whole.

Still as shown in FIGS. 3B-3D, the mounting seat 3505 comprises a main body portion 301. The main body portion 301 is in the form of a cylindrical sleeve with a circular cross section. As shown in FIG. 4A, the main body portion 301 is divided into a head portion 3431 and an insertion portion 3432. The head portion 3431 is connected to the upper end 3438 of the insertion portion 3432 at a connection end 3435 of the head portion. The insertion portion 3432 is configured to be inserted into the mounting hole 230, and the head portion 3431 is positioned outside the mounting hole 230 and connected to the protective cover 3501.

The snapping members 350 are provided on the outer surface of the head portion 3431. The snapping members 350 are formed to protrude outward from the outer surface of the head portion 3431. The snapping members 350 are used for snapping and fitting with the snapping receivers 332 on the protective cover 3501. The number of the snapping members is the same as the number of the snapping receivers 332. the protective cover 3501 in this embodiment being provided with six snapping receivers 332, the mounting seat 3505 are also provided with six snapping members 350 on the outer surface of the head portion 3431. As can be seen in combination with FIGS. 3B and 3D, the snapping members 350 are generally prismatic, with a lower surface 3452 being a flat surface perpendicular to the outer surface of the head portion 3431, and an upper surface 3451 being an inclined surface extending slantly downward from the outer surface of the head portion 3431. As shown in FIG. 3D, when the protective cover 3501 is snapped to the mounting seat 3505, the protective cover 3501 is secured on the outside of the head portion 3431 from the top of the mounting seat 3505, and the inner surface of the protective cover 3501 at the cover wall 331 is snugly attached to the outer surface of the head portion 3431 so as to ensure the secured connection of the protective cover 3501 and the mounting seat 3505 in a horizontal direction. When the protective cover 3501 is snapped downward from the top of the mounting seat 3505, the snapping receivers 332 can be expanded outward, such that the six snapping members 350 are respectively accommodated in the snapping holes 336 of the six snapping receivers 332. In this case, the lower surface 3452 of the snapping member 350 abuts against the snapping hole 336, and the snapping member 350 is configured to match with the snapping hole 336 in such a way that upward movement of the protective cover 3501 relative to the mounting seat 3505 can be prevented. In addition, as shown in FIG. 3D, when the protective cover 3501 is snapped on the top end of the mounting seat 3505, the ribs 3460 provided on the inner surface of the top cover 330 of the protective cover 3501 exactly abut against the top end of the mounting seat 505, thereby preventing the protective cover 501 from moving downward relative to the mounting seat 505.

As shown in FIGS. 3B, 3C, and 3D, the head portion 3431 of the mounting seat 3505 has a greater outer diameter than the insertion portion 3432. The main body portion 301 of the mounting seat 3505 is internally provided with a fluid channel 3401 running through the head portion 3431 and the insertion portion 3432. The portion of the fluid channel 3401 in the head portion 3431 has a greater inner diameter than the portion of the fluid channel 3401 in the insertion portion 3432, and the mounting seat 3505 thus forms an annular support platform 3459 at a position where the head portion 3431 and the insertion portion 3432 meet. A support structure 3512 is provided inside the fluid channel 3401, and the support structure 3512 is located in the insertion portion 3432 and extends inwardly from the support platform 3459. As shown in FIG. 3B, the support structure 3512 comprises a central support post 337 and a plurality of support plates 338. The central support post 337 is located at a center portion of the fluid channel 3401. The support plates 338 are secured to the central support post 337 at one end, and are secured to the inner wall of the main body portion 301 at the other end, such that the plurality of support plates 338 are radially arranged inside the fluid channel 3401. In this embodiment, there are six support plates 338 in total, and the six support plates 338 divide the fluid channel 3401 into six sub-channels 339, and each sub-channel 339 has a vertically communicating structure. The support structure 3512 has a relatively large height at a position where the central support post 337 is located, such that the central support post 337 can be used to engage and support the valve core 3504. As shown in FIG. 3C, the central support post 337 is provided with a mounting member through hole 3510. The inner diameter of the mounting member through hole 3510 is approximately equal to the outer diameter of the extension part 3422 of the valve core mounting member 341, such that the extension part 3422 of the valve core body 340 can be fitly accommodated in the mounting member through hole 3510 of the mounting seat 3505. When the valve core 3504 is engaged on the top of the central support post 337 by the pair of arms 3424 of the valve core mounting member 341, the lower surface on the middle of the valve core body 340 is exactly affixed to the upper surface of the central support post 337 to restrict the upward and downward movements of the valve core 3504 relative to the mounting seat 3505.

The mounting seat 3505 further comprises a blocking portion 302 and a pair of lugs 303. The blocking portion 302 and the pair of lugs 303 cooperate to hold the mounting seat 3505 in the mounting hole 230 of the top plate 105 of the battery pack 100. The blocking portion 302 is arranged on the upper end of the insertion portion 3432 and extends outward from the main body portion 301. In the illustrated embodiment, the blocking portion 302 is arranged on the connection end 3435 of the head portion 3431, and is formed to have a flange shape around the connection end 3435 of the head portion 3431. In some embodiments, the blocking portion 302 may also directly extend from the upper end 3438 of the insertion portion 3432, as long as the size of the blocking portion 302 is configured such that the blocking portion 302 cannot be inserted into the mounting hole 230.

The pair of lugs 303 are arranged on the outer peripheral surface of the insertion portion 3432, and thus the lugs 303 are located below the blocking portion 302. The lugs 303 are separated from the blocking portion 302 by a distance to form a clamping space 3900. The height of the clamping space 3900 is equal to the thickness of the top plate 105 of the battery pack housing 102 or is slightly greater than the thickness of the battery pack housing 102, such that the battery pack housing 102 can be clamped exactly between the blocking portion 302 and the insertion portion 3432.

As shown in FIG. 3D, the lower surface of the blocking portion 302 is flush with the lower edge of the head portion 3431, and the lower surface of the blocking portion 302 is provided with a seal ring groove 3455 for accommodating the seal ring 3506. As can be seen from FIG. 3C in combination with FIG. 3A, the inner side of the seal ring groove 3455 is formed as a circular ring-shaped platform 3456, and the outer side is formed to comprise a plurality of outer abutting members 3457, and the plurality of outer abutting members 3457 are arranged at intervals along an outer edge of the blocking portion 302. As shown in FIG. 3A, some of the plurality of outer abutting members 3457 are each independently arranged on the lower surface of the blocking portion 302, for the rest of the outer abutting members 3457, their ends close to the outer edge of the blocking portion 302 are connected together by a connection bar 3458, and their ends facing the main body portion 301 are still arranged separately. FIG. 3A shows five outer abutting members 3457, two outer abutting members 3457 located at the two radial sides of the blocking portion 302 are arranged independently, and the outer ends of the remaining three outer abutting members 3457 disposed between the above mentioned two outer abutting members 3457 are connected together by the connection bar 3458. The circular ring-shaped platform 3456 and the plurality of outer abutting members 3457 are configured to match with each other in such a way that a seal ring groove 3455 is formed in the lower surface of the blocking portion 302 for engaging the seal ring 3506.

As shown in FIGS. 3A, 3B, and 3C, the pair of lugs 303 of the mounting seat 3505 extend outward from the outer surface of the insertion portion 3432, and are arranged symmetrically with respect to the axis of the insertion portion 3432. As shown in FIGS. 3C and 3E, each of the lugs 303 comprises an elastic arm 3701 and an accommodating portion 3702. The proximal end 3711 of the elastic arm 3701 is connected to the insertion portion 3432, the distal end 3712 of the elastic arm 3701 is a free end, with a protrusion 3704 extending or protruding toward the blocking portion 302 being provided on the upper surface thereof. The accommodating portion 3702 is connected to the insertion portion 3432, and an accommodating space 3703 is provided in the accommodating portion 3702. The accommodating portion 3702 is U-shaped, and an opening end of the U is connected to the outer surface of the insertion portion 3432, such that the accommodating portion 3702 and the insertion portion 3432 together form the accommodating space 3703. As shown in FIG. 3C, in a free state, most of the elastic arm 3701 is accommodated in the accommodating space 3703 of the accommodating portion 3702. The upper surface of the elastic arm 3701 is generally flush with the upper surface of the accommodating portion 3702, but the protrusion 3704 of the distal end 3712 of the elastic arm 3701 is higher than the upper surface of the accommodating portion 3702. When a downward force is applied to the distal end 3712 of the elastic arm 3701, the distal end 3712 of the elastic arm 3701 can move downward, such that the entire elastic arm 3701 is accommodated in the accommodating space 3703 of the accommodating portion 3702.

As can be seen in combination with FIGS. 3B and 3C, the mounting seat 3505 is also provided with a plurality of openings 3403 in the head portion 3431, and the plurality of openings 3403 are arranged at the upper edge of the blocking portion 302 and run through the head portion 3431, such that the gas in the fluid channel 3401 can be discharged to the external environment through the openings 3403. The opening 3403 is elongated, the length direction of the opening 3403 corresponds to the circumferential direction of the head portion 3431, and the plurality of openings 3403 are arranged at intervals in the circumferential direction of the head portion 3431. In this embodiment, the head portion 3431 is provided with six openings 3403, and in other embodiments, the number of the openings 3403 may be different.

The seal ring 3506 has a circular ring shape and is accommodated in the seal ring groove 3455 of the mounting seat 3505. As shown in FIGS. 3A and 3D, when the seal ring 3506 is engaged in the seal ring groove 3455, the inner side of the seal ring 3506 fits with the outer surface of the circular ring-shaped platform 3456, and the outer side of the seal ring 3506 abuts against the inner edge of the outer abutting member 3457. In this embodiment, the seal ring 3506 and the seal ring groove 3455 are engaged together by means of interference fit. Since there is a space between the plurality of outer abutting members 3457 arranged separately, the interference-fitted seal ring 3506 is allowed to be extruded by a margin, which can not only ensure the secure engagement between the seal ring 3506 and the seal ring groove 3455, but also ensure the snug engagement between the seal ring 3506 and the seal ring groove 3455. In other embodiments, the seal ring 3506 can also be secured to the lower surface of the mounting seat 3505 by means of secondary molding.

In order to assemble the pressure relief device 101, firstly, the pressure relief member 3502 may be fixedly connected to the valve core 3504 by the secondary molding, and the waterproof and gas-permeable membrane 3503 is fixed to the upper surface of the valve core 3504 by ultrasonic welding, and then the valve core 3504 with the pressure relief member 3502 and the waterproof and gas-permeable membrane 3503 secured thereon is engaged on the support structure 3512 of the mounting seat 3505, and finally the protective cover 3501 is fixed on the top of the mounting seat 3505 by snapping connection. As shown in FIGS. 3C and 3D, since the support structure 3512 has a relatively high height at the position of the central support post 337, when the valve core 3504 with the pressure relief member 3502 disposed thereon is aligned with the fluid channel 3401 and engaged on the support structure 3512 of the mounting seat 3505, the middle of the valve core body 340 abuts against the support structure 3512 and the edge of the valve core body 340 is suspended above the support structure 3512, and a pressure relief channel 3402 is thus formed between the outer edge of the valve core 3504 and the inner wall of the fluid channel 3401 of the mounting seat 3505 (as shown in FIG. 4).

Figure 4:
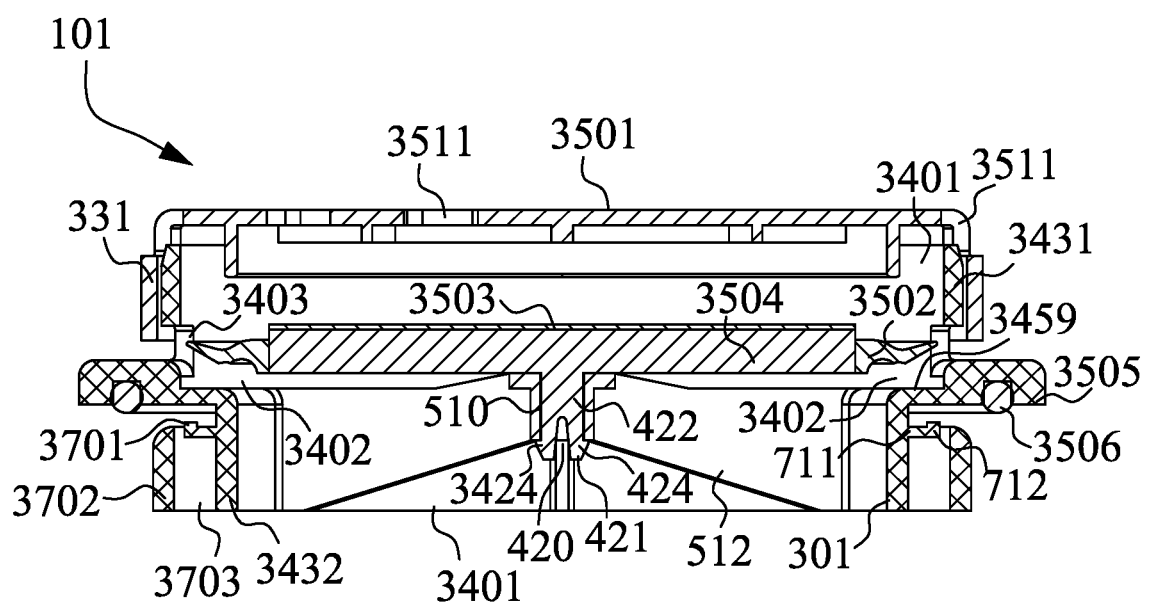
FIG. 4 is a longitudinal section view of the pressure relief device in FIG. 1 in an intensive pressure relief state.

FIG. 4 is a longitudinal section view of the pressure relief device 101 in FIG. 1 in an intensive pressure relief state, showing that the pressure relief member 3502 is deformed in the intensive pressure relief state.

In use, the bottom of the pressure relief device 101 faces a component to be subject to pressure relief. In this embodiment, the component to be subject to pressure relief is a battery pack 100. Since the mounting seat 3505 is internally provided with a fluid channel 3401, the lower side of the pressure relief member 3502 in the pressure relief device 101 is in communication with the interior of the battery pack 100. The lower side of the internal pressure relief member 3502 is a pressure bearing side. As shown in FIG. 3C, in the free state, the pressure relief member 3502 extends slantly downward, and the outer edge of the pressure relief member 3502 abuts against the support platform 3459 inside the mounting seat 3505, such that the pressure relief channel 3402 is closed and the pressure relief member 3502 is in a blocked operating state. The pressure relief member 3502 is made of an elastic material and can deform under the action of an external force. However, when the pressure inside the battery pack 100 is less than the predetermined value, the pressure relief member 3502 is subject to a small pressure and also has low extent of deformation, which is not sufficient to open the pressure relief channel 3402. In this case, since both the protective cover 3501 and the valve core 3504 are provided with through holes, the gas inside the battery pack 100 can be slowly discharged to the external environment through the waterproof and gas-permeable membrane 3503.

As shown in FIG. 4, when the gas pressure inside the battery pack 100 is greater than the predetermined value, that is, the gas pressure on the lower side of the pressure relief member 3502 is relatively large, the pressure relief member 3502 is deformed, and the outer edge of the pressure relief member 3502 flexes up, such that the pressure relief channel 3402 is opened and the pressure relief member 3502 is in an open operating state. Since the openings 3403 in the head portion 3431 are provided above the support platform 3459, just outside the pressure relief channel 3402, the gas escaping from the pressure relief channel 3402 can be quickly discharged to the external environment directly through the openings 3403. When the pressure relief member 3502 is deformed and opened to relieve pressure, the waterproof and gas-permeable membrane 3503 can also play a role of permeability. However, the permeation efficiency of the waterproof and gas-permeable membrane 3503 is much lower than the permeation efficiency resulting from opening the pressure relief member 3502. When the sufficient time for pressure relief elapses and the gas pressure inside the battery pack 100 drops below the predetermined value, the pressure relief member 3502 once again returns to the initial state shown in FIG. 3C, the pressure relief channel 3402 is closed, and the gas is exhausted from the battery pack 100 merely by means of the waterproof and gas-permeable membrane 3503. That is to say, when the pressure inside the battery pack 100 does not reach the predetermined value, the gas-permeable effect of the battery pack 100 is achieved by the waterproof and gas-permeable membrane 3503; and when the pressure inside the battery pack 100 is greater than or equal to the predetermined value, the battery pack 100 quickly releases the pressure through the pressure relief member 3502. In this case, the waterproof and gas-permeable membrane 3503 also plays a role of permeability, but the pressure relief speed through the waterproof and gas-permeable membrane 3503 is slow.

The present application uses a structure in which the valve core 3504 and the mounting seat 3505 cooperate with each other to define a pressure relief channel 3402 in the pressure relief device 101. The elasticity of the pressure relief member 3502 is used to open and close the pressure relief channel 3402, thereby relieving the pressure inside the battery pack 100. The inherent structure of the pressure relief device 101 will not be damaged each time the pressure relief member 3502 is opened to relieve the pressure, therefore, the pressure relief device 101 of the present application can be reused without replacing the pressure relief device 101 for a new one after pressure relief, which greatly reduces the use cost of the pressure relief device 101. In addition, the predetermined pressure value at which the pressure relief device 101 of the present application relieves the pressure can be adjusted based on the selection of the material of the pressure relief member 3502. If the pressure relief member 3502 has a relative high elasticity and a relative low hardness, the predetermined pressure value for the pressure relief device 101 is relative low; and If the pressure relief member 3502 has a relative low elasticity and a relative high hardness, the predetermined pressure value for the pressure relief device 101 is relative high. In the present application, LR or HNBR material is used to prepare the pressure relief member 3502. If the pressure inside the battery pack 100 is relatively low, the pressure relief device 101 of the present application can carry out pressure relief, thereby effectively ensuring the mounting and use of the battery pack 100.

Figure 5:
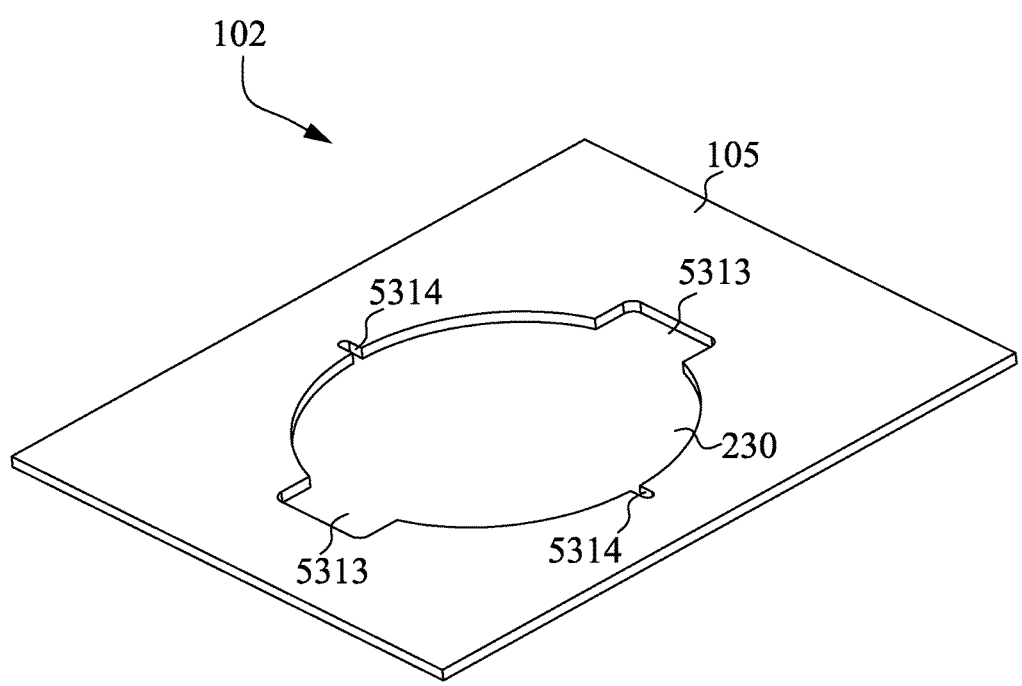
FIG. 5 is a partial perspective view of the top plate of the battery pack in FIG. 2A.

FIG. 5 shows a partial perspective view of the top plate 105 of the battery pack 100 in FIG. 2A, showing the specific structure of the mounting hole 230 in the top plate 105. As shown in FIG. 5, a pair of notches 5313 and a pair of slots 5314 are provided in a wall of the mounting hole 230. The mounting hole 230 is generally circular, and the diameter of the mounting hole 230 is equal to the diameter of the cross section of the insertion portion 3432 or slightly greater than the diameter of the cross section of the insertion portion 3432. The number of the notches 5313 is the same as the number of the lugs 303 in the pressure relief device 101, and the number of the slots 5314 is the same as the number of the elastic arms 3701 in the pressure relief device 101. Corresponding to the pair of lugs 303 and the pair of elastic arms 3701 in the pressure relief device 101 of this embodiment, a pair of notches 5313 and a pair of slots 5314 are correspondingly provided in the mounting hole 230. The pair of notches 5313 and the pair of slots 5314 are respectively arranged symmetrically with respect to the center of the mounting hole 230, and the pair of slots 5314 and the pair of notches 5313 are staggered with respect to each other. In the illustrated embodiment, the pair of notches 5313 and the pair of slots 5314 are arranged separately at four quartered positions in the wall of the mounting hole 230. The notch 5313 is sized to be able to receive the lug 303 of the mounting seat 505, and the slot 5314 is sized to be able to receive the elastic arm 701 of the lug 303.

Figure 6A:
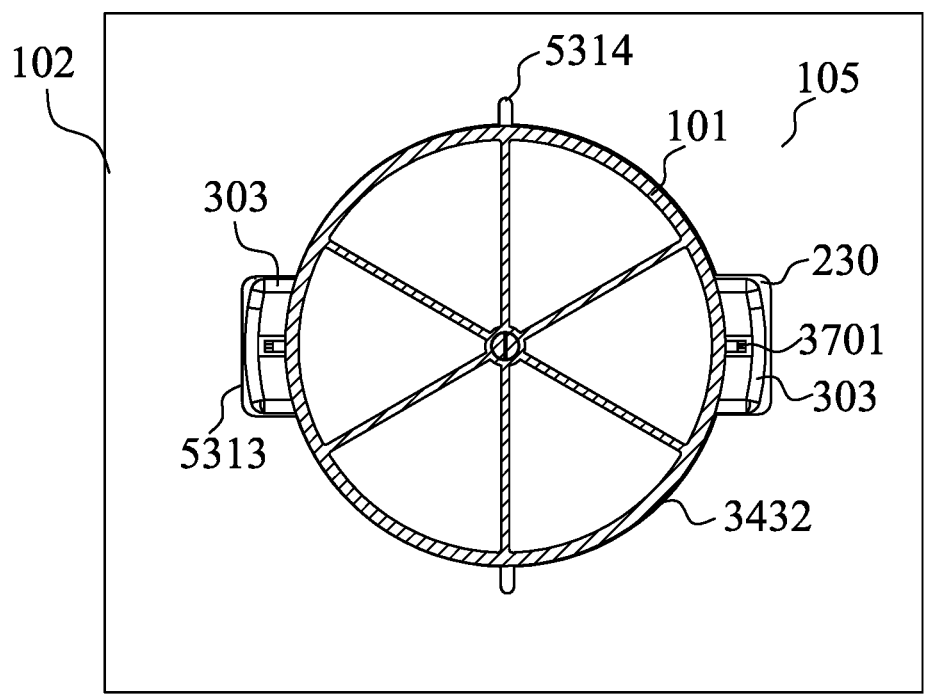
FIGS. 6A and 6B are schematic diagrams of steps for mounting the pressure relief device in FIG. 1 to the top plate of the battery pack as shown in FIG. 5.
Figure 6B:
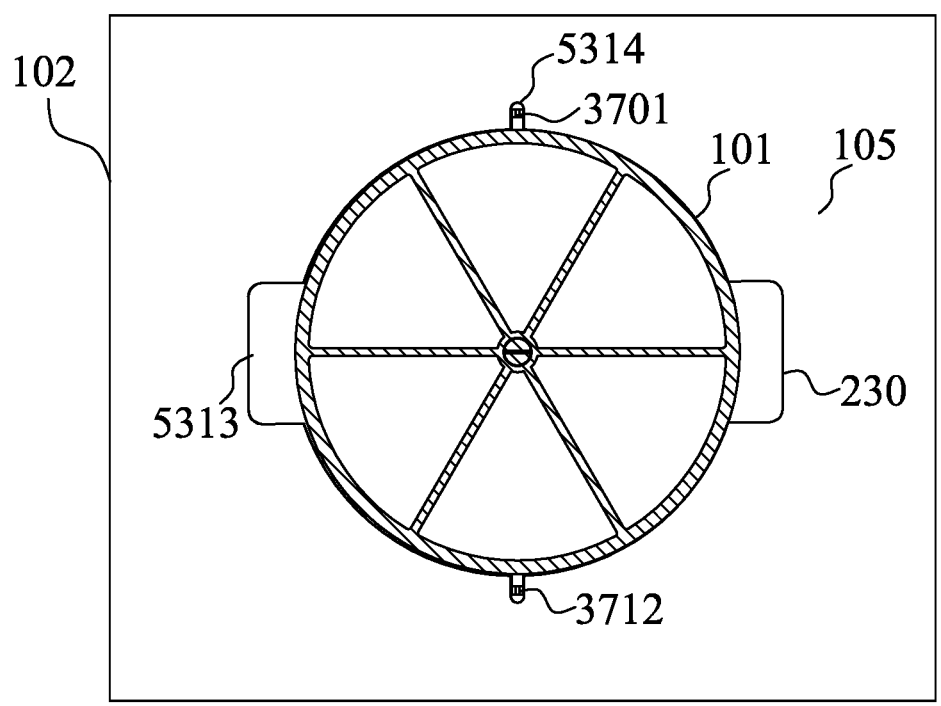

FIGS. 6A to 6B are schematic diagrams of steps of mounting the pressure relief device 101 in FIG. 3A to the top plate 105 of the battery pack 100 shown in FIG. 5. For ease of illustration, FIGS. 6A to 6B represent the mounting and fitting relationship between the pressure relief device 101 and the battery pack housing 102 in section views of the pressure relief device 101 taken along the line C-C in FIG. 3C.

As shown in FIG. 6A, when the pressure relief device 101 is mounted to the top plate 105 of the battery pack housing 102 from the outside of the battery pack 100, the pair of lugs 303 of the pressure relief device 101 are aligned with the pair of notches 5313 in the mounting holes 230 of the top plate 105, respectively, and then the insertion portion 3432 of the pressure relief device 101 is inserted into the mounting hole 230. The pressure relief device 101 is inserted further until the pair of lugs 303 travel to the position below the top plate 105 of the battery pack housing 102. Since the cross sectional area of the blocking portion 302 is larger than that of the mounting hole 230, the blocking portion 302 abuts against the top plate 105. Subsequently, the pressure relief device 101 is rotated by 90° relative to the top plate 105. During the rotation, the two elastic arms 3701 on the lugs 303 always abut against the lower surface of the battery pack housing 102. After the rotation by 90°, the pair of elastic arms 701 reach the positions of the pair of slots 5314 respectively, and the distal ends 3712 of the pair of elastic arms 3701 bounce upward to be partially accommodated in the corresponding slots 5314, thereby mounting the pressure relief device 101 in proper position in the mounting hole 230. Thanks to the engaging and fitting relationship between the elastic arm 3701 and the slot 5314, the pressure relief device 101 and the mounting hole 230 are no longer easily moved with respect to each other, thereby positioning the pressure relief device 101 during the process of mounting it in the battery pack housing 102 and preventing the pressure relief device 101 from rotating relative to the battery pack housing 102 and disengaging from the battery pack housing 102. As the lug 303 deviates from the position of the notch 5313 after the rotation, the lug 303 after the rotation abuts against the lower surface of the battery pack housing 102 and cooperates with the blocking portion 302 on the upper surface of the battery pack housing 102 to clamp the top plate 105 of the battery pack housing 102 in the clamping space 3900, thereby securing the pressure relief device 101 on the battery pack housing 102 and restricting the upward and downward movements of the pressure relief device 101 relative to the battery pack housing 102.

Figure 7A:
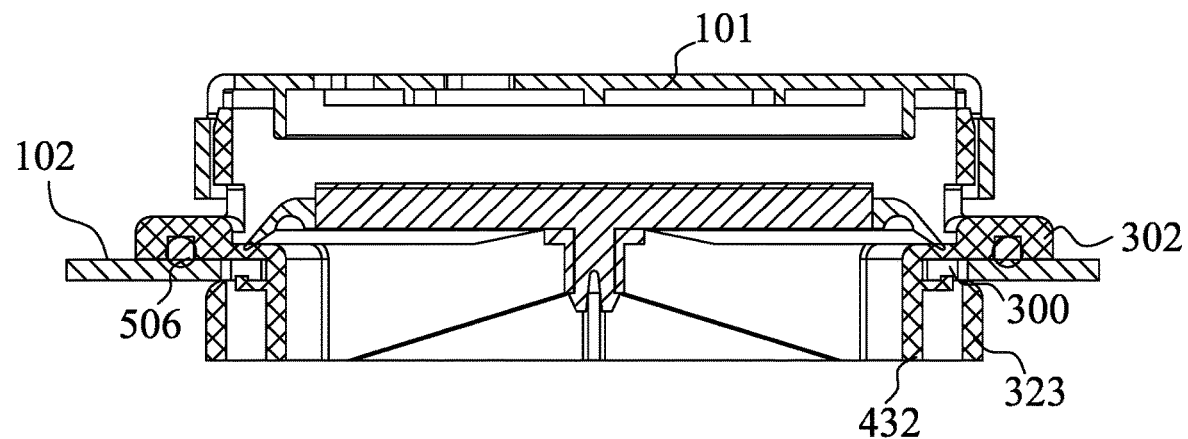
FIGS. 7A and 7B respectively show axial section views of the pressure relief device mounted on the top plate of the battery pack in FIG. 2A taken at different positions.
Figure 7B:
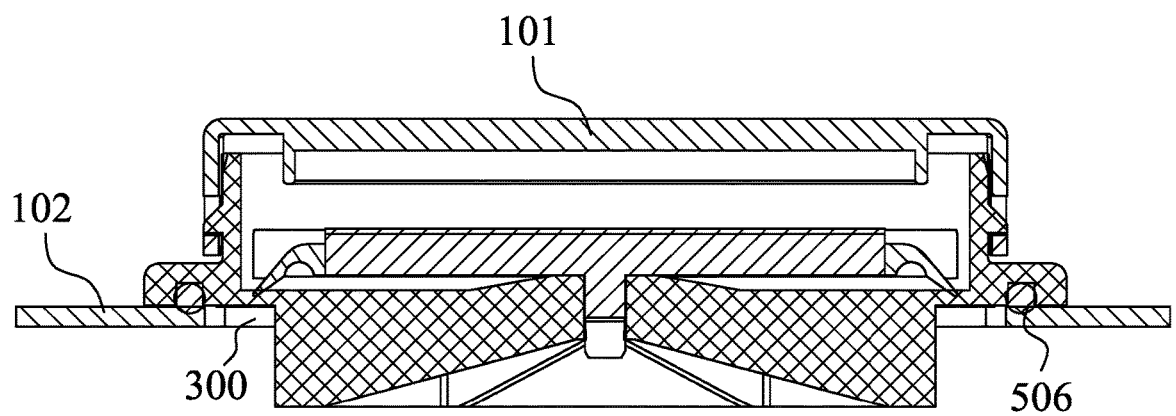

FIGS. 7A and 7B are axial section views of the pressure relief device 101 mounted on the top plate 105 of the battery pack 100 in FIG. 2A taken at different positions, respectively, showing the fitting relationship between the seal ring 3506 and the top plate 105 of the battery pack 100. As shown in FIGS. 7A and 7B, the pressure relief device 101 is mounted in position in the mounting hole 230 in the battery pack housing 102, the head portion 3431 is generally located above the battery pack housing 102, and the insertion portion 3432 is generally located below the battery pack housing 102. The blocking portion 302 and the lug 303 abut against the upper and lower surfaces of the battery pack housing 102 respectively. As the seal ring 3506 is mounted on the lower surface of the blocking portion 302 by interference fit and the seal ring 506 also tightly abuts against on the upper surface of the battery pack housing 102, the top plate 105 of the battery pack housing 102 is prevented from loosening between the blocking portion 302 and the lug 303 of the pressure relief device 101, and the fastening effect of the blocking portion 302 and the lug 303 on the top plate 105 of the battery pack housing 102 is facilitated. In addition, the arrangement of the seal ring 3506 also helps to seal the pressure relief device 101 from the battery pack housing 102, effectively preventing external dust particles or liquid from entering the battery pack 100 through the gap between the pressure relief device 101 and the battery pack housing 102.

In the present application, by means of the arrangement of the blocking portion 302 at an upper end of the insertion portion 3432 of the mounting seat 3505 for the pressure relief device 101, the arrangement of the lugs 303 on the insertion portion 3432, and the arrangement of the notches 5313 capable of receiving the lugs 303 in the wall of the mounting hole 230 in the battery pack housing 102, with the fitting relationship between the blocking portion 302, the lugs 303 and the mounting hole 230, only two steps of inserting the insertion portion 3432 into the mounting hole 230 and rotating the insertion portion 3432 are required to securely mount the pressure relief device 101 on the battery pack 100 by virtue of the blocking portion 302 and the lugs 303 without requiring additional mounting parts and mounting tools, which greatly simplifies the assembly steps of the pressure relief device 101. In this embodiment, the lugs 303 of the pressure relief device 101 comprise two lugs 303, and in other embodiments, other numbers of the lugs 303 may be used, such as one, three, four, etc. In addition, in order to match the arrangement of the number of the lugs 303, it is also necessary to provide a corresponding number of snap receiving portions 313 for mounting holes 300 in the battery pack housing 102.

The pressure relief device 101 of the present application is used in the battery pack 100. In other embodiments, the pressure relief device 101 may also be provided in other components that require pressure relief. In this embodiment, the battery pack 100 adopting the pressure relief device 101 is mounted in an electric vehicle, for example, an electric automobile, a hybrid vehicle, and so on. In other embodiments, the pressure relief device 101 may also be used in battery packs 100 in other technical fields.

The invention claimed is:

1. A pressure relief device, comprising:
    a mounting seat having an internal fluid channel, the fluid channel being configured to provide fluid communication through the pressure relief device between an internal space of a component and an external environment to the component;
    a valve core arranged within the fluid channel of the mounting seat, the valve core being a unitary body having a radially outer edge and that is aligned with the fluid channel such that the outer edge of the valve core is adjacent to and radially inward of an inner wall of the fluid channel and a pressure relief channel is defined by the outer edge of the valve core and the inner wall of the fluid channel of the mounting seat; and
    a pressure relief member arranged on the valve core such that an inner edge of the pressure relief member is aligned with the outer edge of the valve core and an outer edge of the pressure relief member is disposed within the pressure relief channel,
    wherein the pressure relief member is deformable and configured to open the pressure relief channel when the pressure relief member is deformed and to close the pressure relief channel when the pressure relief member is not deformed.

2. The pressure relief device according to claim 1, wherein the pressure relief member has a pressure bearing side, and the pressure relief member is configured to move between a blocked operating state in which the pressure relief channel is closed to an open operating state in which the pressure relief channel is open;
    wherein if a pressure on the pressure bearing side of the pressure relief member exceeds a predetermined value, the pressure relief member is deformed, such that the pressure relief member moves from the blocked operating state to the open operating state; and
    wherein if the pressure on the pressure bearing side of the pressure relief member is less than the predetermined value, the pressure relief member is not deformed, such that the pressure relief member remains in the blocked operating state or moves from the open operating state to the blocked operating state.

3. The pressure relief device according to claim 1, wherein the pressure relief member is comprised of a material having deformation properties.

4. The pressure relief device according to claim 1, wherein the valve core has a circular cross section; and
    wherein the pressure relief member is formed as a ring, such that the inner edge contacts the outer edge of the valve core and the outer edge of the pressure relief member abuts the mounting seat in a free state to close the pressure relief channel.

5. The pressure relief device according to claim 4, wherein the pressure relief member extends outwardly and downwardly from the inner edge to the outer edge.

6. The pressure relief device according to claim 1, wherein an inner surface of the pressure relief member is fixed to an outer surface of an outer rim of the valve core.

7. The pressure relief device according to claim 1, wherein the valve core includes a valve core through hole; and
    wherein the pressure relief device further includes a waterproof and gas-permeable membrane configured to cover the valve core through hole of the valve core, such that gas from the pressure relief channel may be discharged to the external environment through the waterproof and gas-permeable membrane.

8. The pressure relief device according to claim 1, wherein the pressure relief device further includes a protective cover having a protective cover through hole, and
    wherein the protective cover is arranged on the mounting seat, such that the valve core and the pressure relief member are disposed within a space formed by the mounting seat and the protective cover.

9. The pressure relief device according to claim 1, wherein the mounting seat is provided with at least one opening adjacent to the pressure relief member, and
    wherein, when the outer edge of the pressure relief member flexes upwardly, gas flowing between the outer edge of the pressure relief member and the inner wall of the fluid channel is released to the external environment through the at least one opening.

10. The pressure relief device according to claim 1, wherein the pressure relief device is included in a battery pack comprising a battery pack housing, the battery pack housing having a mounting hole, and
    wherein the pressure relief device is mounted to the battery pack through the mounting hole of the battery pack housing.

* * * * *